No. 822,780. PATENTED JUNE 5, 1906.
C. E. SILVIUS.
HORSESHOE.
APPLICATION FILED SEPT. 7, 1905.
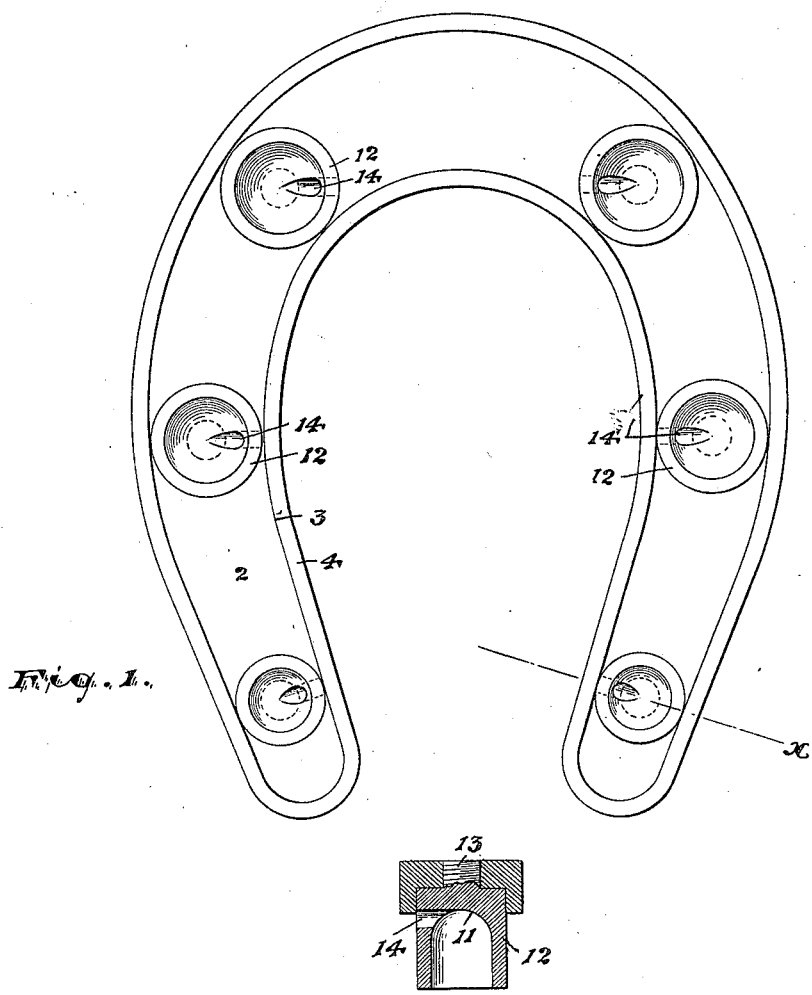

UNITED STATES PATENT OFFICE.

CHARLES E. SILVIUS, OF ROSELLE PARK, NEW JERSEY.

HORSESHOE.

No. 822,780.  Specification of Letters Patent.  Patented June 5, 1906.

Application filed September 7, 1905. Serial No. 277,309.

*To all whom it may concern:*

Be it known that I, CHARLES E. SILVIUS, a citizen of the United States, residing at Roselle Park, in the county of Union and State of New Jersey, have invented certain new and useful Improvements in Horseshoes; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide an improved horseshoe which will be more effective in preventing the horse from slipping, especially when the ground is icy; to prevent the hollow calks from permanently accumulating dirt therein, and thus reducing the efficiency of the calk, and to obtain other advantages and results, some of which may be hereinafter referred to in connection with the description of the working parts.

The invention consists in the improved horseshoe and in the arrangements and combinations of parts of the same, all substantially as will be hereinafter set forth, and finally embraced in the clause of the claim.

Referring to the accompanying drawings, in which like numeals of reference indicate corresponding parts in both figures, Figure 1 is a view of the bottom of the horseshoe or side adapted to come in contact with the ground; and Fig. 2 is a section of the same, taken on line $x$.

In said drawings, 2 indicates the body portion of the shoe, which is made of iron or sterl in substantially the usual shape of a horseshoe in plan and is adapted to be nailed to a horse's foot, as is common. The upper side of the shoe, which lies against the horse's hoof, is flat, while the under side or bottom is recessed, as at 3, leaving at the edges a wall or flange 4, which extends entirely around the periphery of said body portion, as in Fig. 1, or may be cut away at the heel of the shoe. Within the said recess 3 is placed a correspondingly-shaped piece of rubber, which is molded to fit therein and is thick enough to project considerably beyond the said flange 4.

Within the recess 3 I may insert a rubber cushion; but when the road-beds are slippery I prefer to employ hollow or cup-shaped calks 12, having cylindrical side walls and having their open ends downward or so as to engage the ground, said edges being adapted to cut into the ice or frozen ground. Said cup-shaped calks are provided with threaded stems 13, adapted to enter screw-holes in the body portion of the shoe. The interior of the cup-shaped calk is rounded or provided with dome-shaped inner walls 11, and at the inner end of the chamber is formed an exit aperture or passage 14, which perforates the cup and leads outward laterally to conduct the dirt, snow, or the like to the outside, and thus prevent the same from so packing the interior chamber as to lose the advantage of the cup edge. This lateral perforation or aperture may also serve as a wrench-hole for service in screwing the calk into place.

The calks may be removed and replaced by the rubber above referred to when desired.

Having thus described the invention, what I claim as new is—

A horseshoe comprising a body portion, a continuous depending rib arranged around the inner and outer edge of the body portion, and calks secured at intervals to the body portion and projecting beyond the rib, the projecting part of the calk being cylindrical and having a transverse outlet near the top.

In testimony that I claim the foregoing I have hereunto set my hand this 29th day of August, 1905.

CHARLES E. SILVIUS.

Witnesses:
CHARLES H. PELL,
RUSSELL M. EVERETT.